UNITED STATES PATENT OFFICE.

JEHU HOLLINGSWORTH, OF NEW YORK, ASSIGNOR OF ONE-HALF TO JAMES A. WHITNEY, OF DOBBS FERRY, N. Y.

MANUFACTURE OF FLOUR.

SPECIFICATION forming part of Letters Patent No. 258,924, dated June 6, 1882.

Application filed February 14, 1882. (No specimens.)

*To all whom it may concern:*

Be it known that I, JEHU HOLLINGSWORTH, of the city, county, and State of New York, have invented certain Improvements in the Manufacture of Flour, of which the following is a specification.

The object of this invention is to utilize in the manufacture of flour all those components of the wheat berry which are nutritious and capable of easy digestion, and to exclude therefrom those which are unfit for human food, with the result of providing a more than ordinarily digestible and nutritious flour at a diminished cost of manufacture.

The kernel or berry of wheat, as is well known, is composed of the internal portion, principally made up of starch, a brittle and friable coating or envelope surrounding the starch portion just mentioned, and peculiarly rich in gluten, the germ which is attached to the glutinous envelope aforesaid, and which has a somewhat gummy and non-friable consistence or texture, and the outer husk which surrounds the entire kernel or berry, and which comprises several successive layers of practically innutritious substance, which, when separated, is known as "bran." Of the said components of the kernel or berry only the starch and glutinous substance aforesaid are fitted for human food, and when the whole of these is made into flour without admixture of the other substances, as by my invention, then the flour is practically perfect as a material for human food. My invention comprises a novel process designed to secure this result, and also comprises the new article or manufacture—wheaten flour having the properties just above indicated.

In the practice of my said invention I take the wheat and subject it to any suitable "decorticating operation," so called, by which the outer husk or bran-producing material is removed, except in the groove or crease of the berry, which, from its depressed or inclosed position, cannot by any of the usual means of decortication be reached or removed. As the decortication of wheat is an operation well known and capable of being performed by various well-known machines, a specific description of such operation is here unnecessary.

Having obtained the decorticated wheat, I first subject the same to the action of crushing and non-cutting roller-mills, and the usual or any appropriate adjuncts thereof, to reduce said decorticated wheat to meal or flour, this roller-reducing of the decorticated grain being by any of the usual or suitable roller apparatuses used for reducing rough or undecorticated wheat by a crushing as distinguished from a cutting or slicing action, but with this important and essential difference in the *modus operandi* and result: In the roller-grinding of rough or undecorticated wheat the husk or bran is subjected to the same action as the starch and glutinous portions, and a material quantity of said substances is incorporated with the bran and consequently lost. By first removing from the wheat, as far as possible, the husk or bran-producing substance, four primary results are secured: First, the quantity of bran is reduced to a very small percentage of that resulting from the roller-grinding of rough or undecorticated wheat; second, the small portion of bran remaining is composed of the husk situate in the crease of the berry, and this, in the fracture of the latter, is liberated without adhesion to any material portion of the glutinous and starchy components of the berry; third, the husk or bran material is detached without being rubbed or abraded under pressure, and therefore produces no fine particles of bran, the presence of which in flour gives a discolored appearance, which once incurred is incapable of removal; fourth, the scales of bran arising from the detachment of the husk from the crease, being comparatively coarse, are readily separated from the glutinous substance and the starch, and when, with the germs, thus removed by any ordinary or suitable means, leave the glutinous and starchy components of the wheat purified from useless matter, and requiring only to be reduced to the degree of fineness requisite for flour, this being insured by roller-grinding, as in the well-known "gradual-reduction" method of manufacturing flour. In each and all of these respects, therefore, my invention differs from the production of flour from rough or undecorticated wheat by roller-grinding or gradual-reduction methods hitherto in use.

Furthermore, my invention, in its *modus operandi* and results, differs in important and essential respects from any manufacture of flour from decorticated wheat hitherto known, the latter, so far as I am informed, having been wholly dependent upon the use of millstones or cutting and slicing blades and incapable of producing the useful results secured by my said invention. When decorticated wheat is subjected to the action of millstones the husk or bran-producing material from the groove or crease of the berry is subjected to a grinding operation which brings a portion thereof to the fineness of the flour, thereby not only introducing into the flour an innutritious and useless impurity, but also to some extent discoloring the same, and in the same ratio diminishing its market value.

Inasmuch as in the practice of my said invention the husk or bran-producing material from the groove or crease of the berry is separated as aforesaid in the early stages of the gradual-reduction operation, the starchy substance of the berry breaking or being reduced to one general intermediate form or shape, and the glutinous substance thereof being harder, more brittle, and fracturing into larger granules, breaking or being reduced to another general form or shape and, as just indicated, different size, the two substances may be separated by suitable separating apparatus well understood in the trade to produce by their subsequent ultimate reduction two grades of flour—one white and substantially a starch, and the other markedly yellow and substantially a gluten; but in order to insure the most nutritious flour, that best fitted for human food, and the greatest advantage from my said invention, the glutinous and the starchy components of the wheat should both be included in the flour, notwithstanding the slight yellow tint that may be given to the product by the presence of the gluten. When it is thought that either component will be in excess to suit the requirements of the market, the separated glutinous and starchy products of the wheat may be remingled in any desired proportions previous to the final reduction of the materials to the fineness of flour.

When desired the use of the roller-mill may be discontinued after the berry has been crushed to the granular form of meal and the bran from the crease (together with the germ) has been eliminated therefrom, as hereinbefore explained, (which said elimination may be effected by any of the suitable means usually known in the trade for like purposes,) and the subsequent reduction of this meal or partially-reduced material to flour may be effected by millstones. In general, however, the use of roller-mills is to be preferred even in these final stages of the reduction of the wheat to flour.

I do not claim the simple grinding of decorticated wheat with millstones; neither do I claim the simple cutting of decorticated wheat into semolina or finer product by the action of cutting-blades; but

What I claim as my invention is—

1. The process of manufacturing flour which consists in crushing decorticated wheat to liberate the husk within the crease of the berry, separating the said portion of the husk from the food-product, and then converting the purified food-product to flour, substantially as herein set forth.

2. As a new article of manufacture, wheat-flour composed of the starchy and the glutinous components of wheat in substantially the proportions in which they exist in nature in the wheat-berry, and freed from ground bran or germ, substantially as herein set forth.

JEHU HOLLINGSWORTH.

Witnesses:
GEO. M. BAKER,
THOMAS E. CROSSMAN.